United States Patent [19]

Kaleskas et al.

[11] Patent Number: 5,045,048

[45] Date of Patent: Sep. 3, 1991

[54] ROTARY CENTRIFUGE BOWL AND SEAL FOR BLOOD PROCESSING

[75] Inventors: Edward W. Kaleskas, Jefferson; Thaddeus G. Minior, Jr., Bedford; Sepideh H. Nott, Fall River, all of Mass.

[73] Assignee: Haemonetics Corporation, Braintree, Mass.

[21] Appl. No.: 502,102

[22] Filed: Mar. 29, 1990

[51] Int. Cl.$^5$ .................... B04B 7/08; F16J 15/54
[52] U.S. Cl. .................... 494/41; 277/90; 277/92; 277/96; 277/96.2; 494/65
[58] Field of Search .................... 494/38–41, 494/43, 60, 64, 65, 67; 604/4, 6; 285/280–281, 375; 277/88, 90, 96.1, 96.2, 81 R, 85, 92, 96

[56] References Cited

U.S. PATENT DOCUMENTS

| | | | |
|---|---|---|---|
| 2,083,438 | 6/1937 | Dube | |
| 2,858,149 | 10/1958 | Laser | |
| 3,027,165 | 3/1962 | Kempff et al. | |
| 3,122,375 | 2/1964 | Greenwald | 277/88 |
| 3,127,342 | 3/1964 | Mitchell | |
| 3,129,174 | 4/1964 | Pickels et al. | |
| 3,145,713 | 8/1964 | Latham, Jr. | 494/41 X |
| 3,317,127 | 5/1967 | Cole | 494/43 |
| 3,409,213 | 11/1968 | Latham, Jr. | 277/88 X |
| 3,565,330 | 2/1971 | Latham, Jr. | 277/88 X |
| 3,782,735 | 1/1974 | Novosad | 277/88 X |
| 3,801,142 | 4/1974 | Jones et al. | 285/375 X |
| 3,874,680 | 4/1975 | Mustoe et al. | 277/96 R |
| 4,103,906 | 8/1978 | Gits | |
| 4,140,268 | 2/1979 | Lacour | 494/41 |
| 4,300,717 | 11/1981 | Latham, Jr. | 494/41 |
| 4,415,167 | 11/1983 | Gits | 277/88 |
| 4,451,049 | 5/1984 | Charhut | 277/88 X |
| 4,629,564 | 12/1986 | Pinato | 494/41 X |
| 4,654,023 | 3/1987 | Foldhazy | 494/41 |
| 4,684,361 | 8/1987 | Feldman et al. | 277/81 R |
| 4,692,136 | 8/1987 | Feldman et al. | 277/81 R |
| 4,767,396 | 8/1988 | Powers | 494/60 |
| 4,776,598 | 10/1988 | Akema | 277/96.1 X |
| 4,779,876 | 10/1988 | Novosad | 277/88 X |
| 4,846,728 | 7/1989 | Roman | 494/41 |
| 4,879,031 | 11/1989 | Panzani | 494/38 X |
| 4,943,273 | 7/1990 | Pages | 494/64 X |
| 4,983,158 | 1/1991 | Headley | 494/41 |

OTHER PUBLICATIONS

Allen Latham, Jr., Abstract (A New Design Approach to Automated Centrifugal Processing of Blood, presented at: American Association of Blood Banks 21st Annual Meeting), Washington, DC (Oct. 1968).
Latham Blood Processor Instruction Manual for the Model 10 Latham Blood Processor Apparatus.

*Primary Examiner*—Philip R. Coe
*Assistant Examiner*—C. E. Cooley
*Attorney, Agent, or Firm*—Hamilton, Brook, Smith & Reynolds

[57] ABSTRACT

A seal for a blood processing centrifuge bowl which is formed of a dynamic rotary seal and a static seal. The dynamic rotary seal is formed of an upper graphite or carbon non-rotating ring member and a lower two-piece rotatable ring member formed of a ceramic bearing surface bonded by adhesive to a plastic adapter ring. The static seal is comprised of an elastomeric diaphragm formed over the upper ring member and secured thereto by a plastic retaining ring.

12 Claims, 2 Drawing Sheets

ROTARY CENTRIFUGE BOWL AND SEAL FOR BLOOD PROCESSING

BACKGROUND ART

In October 1968, Allen Latham, Jr. presented a paper entitled "A New Approach to Automated Centrifugal Processing of Blood" at the 21st Annual Meeting of the American Association of Blood Banks, in which he described a system for processing blood using an expendable, or disposable, centrifuge rotor in the form of a relatively inexpensive bowl. The system was proposed for use in a number of pheresis procedures, such as plasmapheresis, plateletpheresis and thrombocytapheresis. In these processes, whole blood is taken from a donor and various blood components are separated from the whole blood and harvested while some components are returned to the donor. The system was also suggested for use in cell washing, such as in deglycerolization, in which thawed deglycerized red cells are washed to remove the glycerene preservative before being infused in a patient.

In operation, the bowl is held in a chuck which is attached to a spindle and driven by a motor. The bowl consists of a rotor, or bowl body portion in which blood component is separated and a stator portion consisting of an input and output port. A rotary seal couples the stator to the rotor. One side of the input port is connected through a first peristaltic pump to a source of whole blood from a donor and the other side is in fluid communication with a fractionation volume in the rotor. Anticoagulant is mixed with the whole blood prior to entry into the centrifuge bowl.

The rotor is rotated at a fixed speed and various blood fractions are collected at the output port and directed into appropriate containers, such as plastic bags, by diverting the flow through plastic tubing in accordance with the setting of three-way clamp/switches.

Fractionation within the centrifuge is determined by the relative densities of the different cell components being separated and collected. The various cell fractions pass through the outlet port of the centrifuge bowl by progressive displacement from the lower portion of the bowl.

The bowl consists of two major subassemblies. One is a rotatable bowl body with an inner cylindrical core mounted coaxial to a central longitudinal axis through the bowl body. The other is a rotary seal and header assembly, which is provided on top of the bowl body.

The header assembly must remain fixed, since the inlet and outlet tubing to, or from, a donor or patient, is coupled to it. The rotary seal provides the appropriate interface between the fixed header and the rotating bowl body.

The system, including the bowl, interconnecting tubing and receptacles, are connected together and sterilized in advance of use, so that they arrive in sterile form ready for immediate use. All parts, other than the rotary seal assembly, are generally made from blood-compatible plastic, such as polycarbonate (for the bowl), or polyethylene (for the tubing and receptacles).

While the design of such blood processing centrifuge bowls, now called the Latham bowl, has evolved over the years, the basic structure remains the same and one of the key elements is still the rotary seal.

The rotary seal must be capable of meeting a number of stringent and, in some cases, opposing requirements.

1. Sterile air is present in the bowl when shipped. The seal must be capable of minimizing air leakage out of the bowl or introduction of non-sterile air into the bowl under prescribed ambient pressure ranges.

2. Blood components come in contact with portions of the seal. The seal must therefore minimize frictional heating and be capable of rapidly dissipating any heat generated to avoid thermal damage to the blood components. Also, the materials used in the seal which come in contact with the blood should preferably be blood-compatible and non-toxic.

3. The generation of particulates from the seal should be minimized and any particulates so generated should be prevented from entering the bowl body.

4. Since the bowl is part of a disposable assembly, it should be made of simple, low-cost, reproducible parts, easily assembled and tested and reliable in order to produce an economically reproducible and reliable system.

One of the earlier Latham bowl seals is disclosed in U.S. Pat. No. 3,409,213 and comprises a dynamic seal and a secondary seal. The dynamic seal is formed of an upper rotating ring member of carbon or graphite, which rotates against a non-rotating shoulder of an aluminum inlet tube. The shoulder is coated with oxide to provide a low friction bearing surface. The secondary seal is a static seal comprised of an elastomer member formed of silicone rubber.

A more complicated rotary-seal system was developed by Bellco of Mirandola, Italy, and is described in U.S. Pat. No. 4,300,717 in connection with FIG. 1 thereof. Briefly, this seal consisted of a dynamic seal comprising an upper non-rotatable graphite ring member which rested on top of a lower rotatable ceramic ring attached to first and second adapter rings formed respectively of aluminum and plastic. The adapter rings, in turn, are affixed to the bowl body by bonding the second adapter ring to the bowl neck at the periphery thereof. A secondary seal is formed by an elastomeric diaphragm attached to a third adapter ring which, in turn, is affixed to the upper graphite ring member.

In U.S. Pat. No. 4,300,717, Latham describes, in connection with FIG. 6, an improved rotary seal which also uses a non-rotatable graphite upper ring, as in the Bellco bowl, and a lower rotatable ceramic ring, which is directly affixed to the bowl body at the neck thereof. This seal incorporated an area of non-contact radially inwardly from the area of contact for entrapping particles generated in the area of contact, so that such particles are ingested in the area of contact and eventually expelled, so that they do not enter the bowl body section and co-mingle with blood components.

In an alternate embodiment (FIG. 8) of the '717 patent, an intermediate metal adapter ring is interposed between the ceramic lower ring and the neck of the bowl body to help dissipate heat.

SUMMARY OF THE INVENTION

Despite extensive research and development in this field over the past two decades, a number of problems still exist in blood processing rotary seals for Latham-type centrifuge bowls. The present invention resolves most of these problems by providing an improved seal system which consists of an upper graphite or carbon non-rotatable bearing surface ring member and a lower rotatable ceramic bearing surface ring member bonded to a blood compatible plastic adapter ring member which is, in turn, affixed to the bowl body neck. The ceramic ring has a generally flat upper contact seal surface and a lower support surface which abuts the adapter ring member.

The lower support surface has three portions, the first of which extends radially from the inner periphery of the ring, where it meets with a second portion which extends vertically downward towards the bowl body until it meets the third portion which extends radially outwardly to the outer periphery of the ring. These three portions mate with, or abut, corresponding portions formed on the outer upper periphery of the plastic adapter ring member.

The adapter ring member has three radially extending steps formed in its upper outer surface. An innermost radial first step starts at an inner first vertical wall portion and is joined to an intermediate second radial step by a second vertical wall portion. The second step is joined to a third outermost radial step by a radially outwardly and downwardly inclined wall portion. An end wall, located at the periphery of the ring member, extends from the third step and abuts the neck of the bowl body and is bonded, or otherwise affixed, thereto.

The first, second and third portions of the lower support surface abut with and are bonded to the respective first step, first wall and second step of the adapter ring member.

A series of concentric projections are formed on one, or both, of the first and second steps to aid in bonding the adapter ring to the ceramic ring at the interface between the first and second steps with the corresponding surfaces of the ceramic ring. The area where these surfaces abut forms an adhesive area where adhesive is applied to bond the two parts together.

A secondary, or static, seal is formed of a ring-shaped diaphragm of elastomeric material which is joined at a radially inward periphery to the outer periphery of a non-rotatable plastic effluent tube and at a radially outward lower periphery to the upper non-rotatable carbon or graphite ring member. A plastic band is provided about the periphery of the diaphragm where it is joined to the upper ring member to provide hoop tension for securing the diaphragm to the ring member.

A circular projection is formed around the inner periphery of the adapter ring as a barrier to prevent particulates from entering the bowl body.

There is thus provided an improved blood processing centrifuge seal in which the unique blood compatible properties of plastic material are utilized, where blood is likely to be in contact with the seal parts, i.e., all surfaces beneath or radially inward from the lower rotatable ceramic ring member. At the same time, the unique bearing properties of the ceramic ring are maintained for low friction durable sealing purposes, thereby minimizing frictional heating and eliminating the necessity of adding a less than optimum blood compatible metal heat sink for the ceramic ring. The added surface projections on the adapter ring provide a larger surface area for adhesive bonding and thereby increase the shear stress of the bonded area.

The stepped structure of the adapter ring accomplishes a number of functions. It provides a positive location shoulder for properly mating parts before adhesion. It provides greater surface area for bonding than a flat surface, and it locks the parts in place aiding in resistance to the centrifugal forces exerted during rotation of the bowl.

BEST MODE OF CARRYING OUT THE INVENTION

Figure 1:
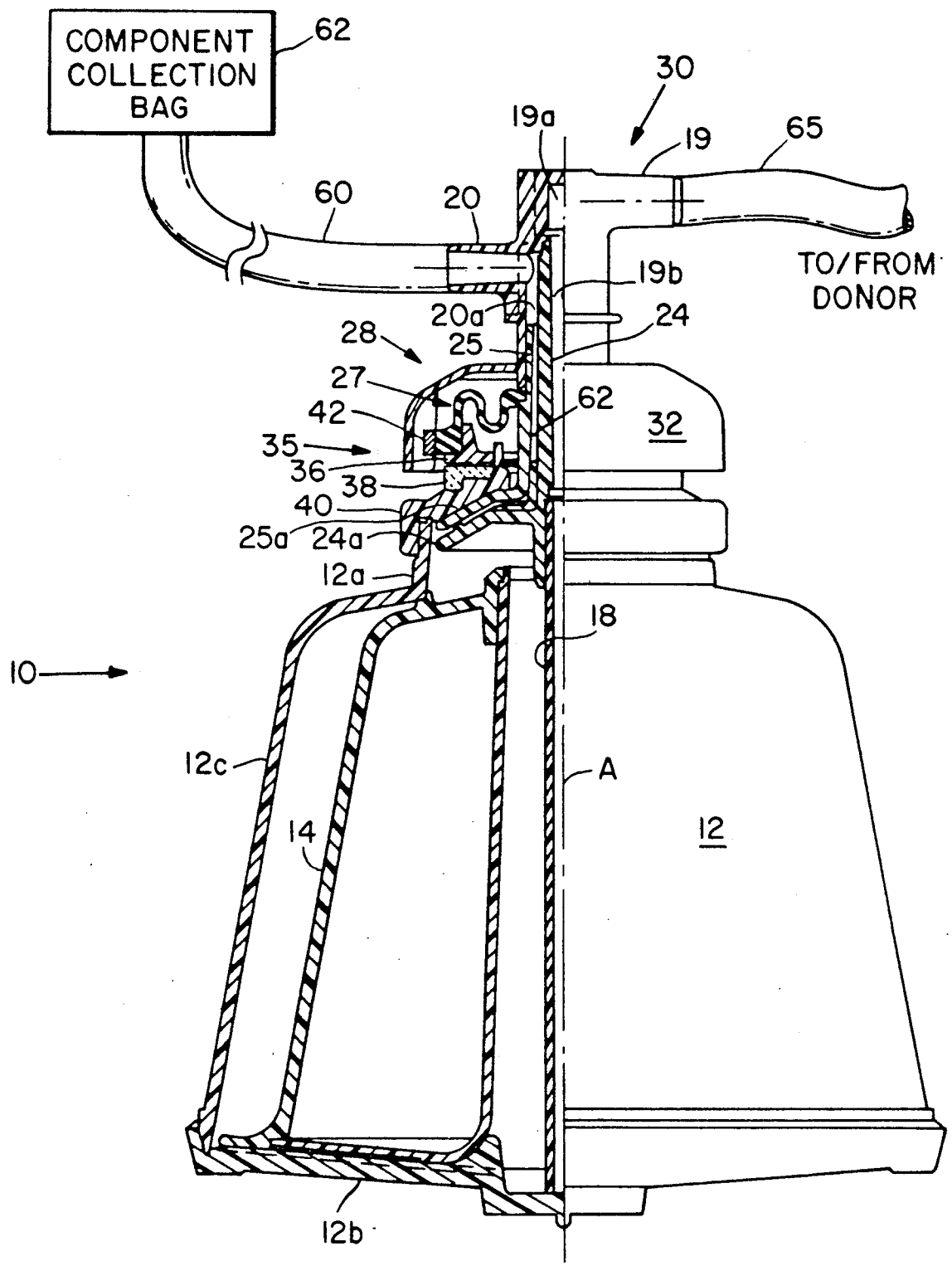
FIG. 1 is a partial cutaway side cross-sectional view along an axis of symmetry A of the centrifuge bowl of the present invention shown with tubing and connected to a collection bag.

Referring now to FIGS. 1-8, a preferred embodiment of the invention will now be described in connection therewith. As may be seen therein, the apparatus of the invention comprises a disposable centrifuge rotor, or bowl, 10, which is used for processing blood from a patient or donor. The bowl comprises, in general, a seal and header assembly, shown generally at 28, a plastic two-piece bowl body, shown generally at 12 (FIG. 1) and a core member 14.

The seal and header assembly 28 provides a rotary seal and fluid communication pathway between the interior of the rotatable bowl body 12 and stationary conduits 65 and 60 connected at one end, respectively, to input port 19 and outlet port 20. The other end of conduit 60 is coupled to a component collection bag while the other end of conduit 65 is coupled to a phlebotomy needle connected to a patient or donor. Assembly 28 is comprised of a stationary header, shown generally at 30, an effluent tube 25, a feed tube assembly, shown generally at 24, and a rotary seal, formed of a dynamic seal 35 and a static seal 27.

The dynamic seal consists of an upper graphite or carbon non-rotatable ring member 36 and a lower rotatable ceramic ring member 38 bonded to a blood compatible plastic adapter ring member 40 which is, in turn, affixed to the bowl body neck 12a. The ceramic ring member 38 has a generally flat upper contact seal surface 38a and a lower support surface 38b which abuts the adapter ring member 40. Preferably, a ceramic of aluminum oxide is used for member 38.

Figure 4:
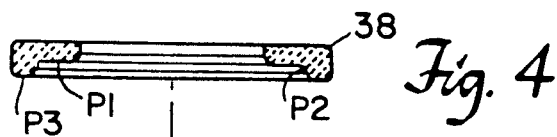
FIG. 4 is a detailed sectional side view of ring member 38.
Figure 3:
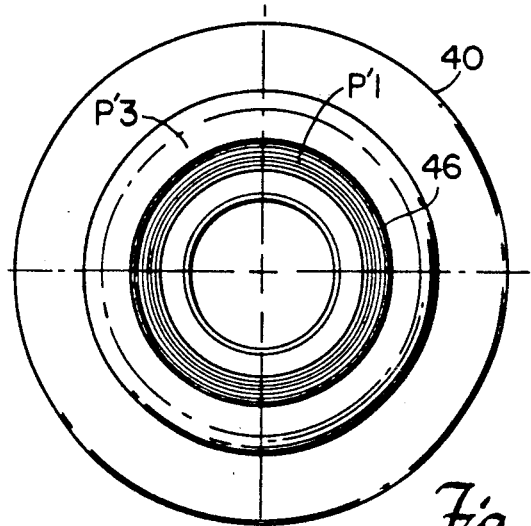
FIG. 3 is a top view of the plastic adapter ring member 40 of FIG. 2.
Figure 8:
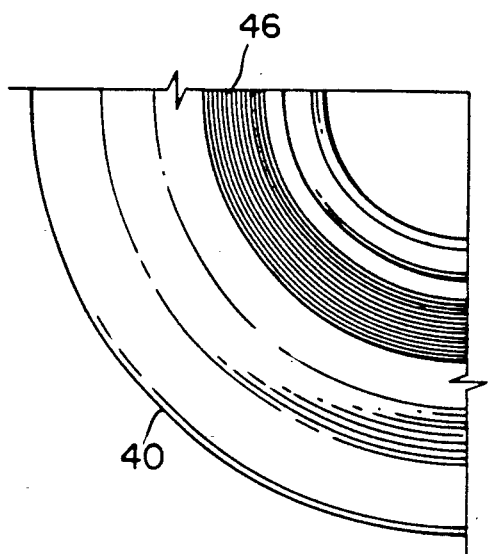
FIG. 8 is an enlarged view of the lower left quadrant of FIG. 3.
Figure 7:
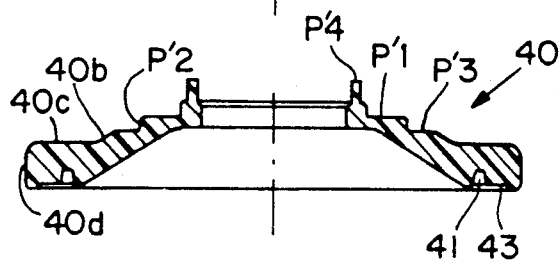
FIG. 7 is a side sectional view of the plastic ring member 40 of FIG. 3.
Figure 6:
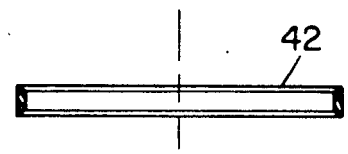
FIG. 6 is a side sectional view of the retaining ring 42 for the static shield.
Figure 2:
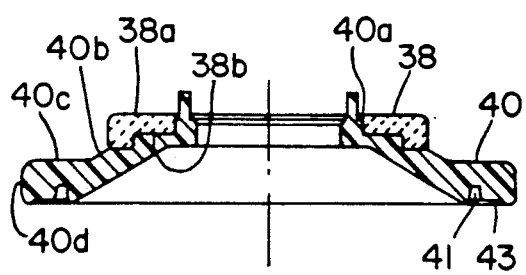
FIG. 2 is a sectional view of the lower rotatable ring member 38 bonded to a plastic adapter ring member 40.

The lower support surface has three portions, the first of which P1 extends radially from the inner periphery of the ring, where it meets with a second portion P2 which extends vertically downward towards the bowl body until it meets with the third portion P3 which extends radially outwardly to the outer periphery of the ring (See FIG. 4). These three portions mate with, or abut, corresponding portions P'1, P'2, P'3 formed on the outer upper periphery of the plastic adapter ring member 40 (See FIGS. 2 and 3).

The adapter ring member is preferably formed of polycarbonate and has three radially extending steps formed in its upper outer surface. An innermost radial first step P'1 starts at an inner first vertical wall portion 40a and is joined to an intermediate second radial step 40c by a radially outwardly and downwardly inclined wall portion 40b. An end wall 40d, located at the periphery of the ring member 40, extends from the third step 40c. A circumferential notch 41 is formed on the bottom surface 43 of member 40. This notch abuts the neck 12a of the bowl body 12 and is crimped, bonded, or otherwise affixed thereto.

The first P1, second P2 and third P3 portions of the lower support surface 38b abut with and are adhesively bonded to the respective first step P'1, first wall P'2 and second step P'3 of the adapter ring member 40.

A series of concentric projections 46 (See FIGS. 3 and 8) are formed on one, or both, of the first P'1 and second P'3 steps of member 40 to aid in bonding the adapter ring to the ceramic ring 38 at the interface between the first and second steps with the corresponding surfaces of the ceramic ring 38. The area where these surfaces abut forms an adhesive area where a suitable adhesive, such as an ultraviolet light activated methocrylate based adhesive, is applied to bond the two parts together.

A circular upwardly projecting portion P'4 is also formed on ring 40 about the inner periphery of the ring to serve as a projectile barrier to prevent particulates which may emanate from the seal surfaces from entering the passageways into the bowl body, per se.

Figure 5:
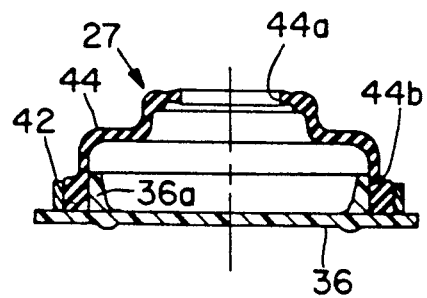
FIG. 5 is a side sectional view of the upper non-rotatable ring member 38 of FIG. 1 with the static seal 27 attached to it.

A secondary, or static, seal 27 is shown in detail in FIG. 5. The static seal is formed of a ring-shaped diaphragm 44 of elastomeric material which is joined at a radially inward periphery 44a to the outer periphery of the non-rotatable plastic effluent tube 25 and at a radially outward lower periphery 44b to the shoulder 36a of the upper non-rotatable carbon or graphite ring member 36. A plastic band 42, preferably of polycarbonate, is provided about the periphery of the diaphragm 44 where it is joined to the upper ring member. This band 42 forms a retaining ring to provide hoop tension for securing the diaphragm 44 to the ring member 36.

There is thus provided an improved blood processing centrifuge seal in which the unique blood compatible properties of plastic material are utilized, where blood is likely to be in contact with the seal parts, i.e., all surfaces beneath or radially inward from the lower rotatable ceramic ring member. At the same time, the unique bearing properties of the ceramic ring are maintained for low friction durable sealing purposes, thereby minimizing frictional heating. The added surface projections on the adapter ring provide a larger surface area for adhesive bonding and thereby increase the shear stress of the bonded area.

Referring back to FIG. 1, the header 30 is comprised of an integral formed member having a transverse inlet bore or port 19 extending into an axial longitudinal passageway 19a coupled to an inner axially longitudinal bore 19b of feed tube assembly 24 and, in turn, to feed tube stem 18, thus forming a non-rotating inlet path for anticoagulated whole blood to enter the interior of centrifuge bowl body 12.

Header 30 also includes an outlet port, or bore 20, which extends transversely into a peripheral channel 20a extending in coaxial relationship with the feed tube assembly 24 and into an outlet passageway 62. An outer shield member 32 is formed on header 30 and extends over the seals 35 and 27.

Feed tube assembly 24 is formed with a lower integral skirt 24a. A complimentary upper integral effluent tube skirt 25a is formed on effluent tube 25.

The header and seal assembly 28, as thus described, is formed and assembled as an individual entity and is inserted through an upper central opening in bowl body 12, and coupled and bonded to the neck 12a on the periphery of bowl body 12 after core member 14 has been inserted from below and fixed in place within the bowl body 12 and the bottom wall 12b of the bowl joined to the vertical cylindrical wall 12c.

Equivalents

Those skilled in the art will recognize, or be able to ascertain, employing no more than routine experimentation, many equivalents to the specific structures, steps, functions and materials described herein, and such equivalents are intended to be encompassed within the scope of the following claims.

We claim:

1. In a rotary centrifuge bowl having a non-rotatable header coupled by a rotary seal to a bowl body, the improvement comprising:
   a) a dynamic rotary seal having:
      (i) an upper non-rotatable bearing surface ring member; and
      (ii) a lower rotatable bearing surface ring member formed of a ceramic, one planar side of which faces said upper ring member; and
      (iii) an adapter ring member formed of blood compatible plastic and adhesively bonded to a side of said lower ring member opposite said planar side, said adapter ring being directly connected to a neck of said bowl body about the periphery thereof and including projections integrally formed on a surface of said adapter ring member to which said lower ring member is bonded and wherein the adapter ring is a molded piece and the projections are integrally formed thereon and wherein a side of the lower ring member opposite said planar side is formed of at least three portions:
      (i) a first portion which extends radially from the inner periphery of the lower ring member;
      (ii) a second portion which extends vertically downward toward the interior of the bowl body; and
      (iii) a third portion which extends radially outwardly from the second portion to the outer periphery of the lower ring member.

2. The bowl of claim 1 wherein the adaptor ring member has at least three radially extending steps formed in the surface bonded to the lower ring member; and two such steps mate with respective first and third portions of the lower ring member.

3. The bowl of claim 2 wherein the projections are formed on one of the steps of the adapter ring member which mates with one of the portions of the lower ring member.

4. The bowl of claim 2 further including a circular projecting fourth portion extending about the inner periphery of the adapter ring member and projecting above said lower ring member to form a particle barrier to entry of particulates from said seal.

5. The bowl of claim 3 further including a static seal formed of an elastomeric diaphragm with first and second ends, and the first end is joined to said header, and the second end is joined to said upper ring member about the periphery of said upper ring member.

6. The bowl of claim 5 wherein the upper ring member has a peripheral shoulder and the second end of the diaphragm is affixed to said shoulder and a plastic retaining ring encircles the second end to secure the diaphragm to the upper ring member.

7. A disposable blood processing set comprised of:
a) a blood processing receptacle bag;
b) a rotary centrifuge bowl having a non-rotatable input port and output port;
c) blood compatible tubing connecting the output port to the bag and for connecting the input port to a source of whole blood and wherein said bowl includes a rotatable bowl body and a dynamic rotary seal coupling said bowl body to said input and output ports, said dynamic rotary seal having:
 (i) an upper non-rotatable bearing surface ring member; and
 (ii) a lower rotatable ceramic bearing surface ring member, one planar side of which faces said upper ring member; and
 (iii) an adapter ring member formed of blood compatible plastic and adhesively bonded to a side of said lower ring member opposite said planar side, said adapter ring being directly connected to a neck formed around an aperture of said bowl body about the periphery thereof and further including projections integrally formed on a surface of said adapter ring member to which said upper ring member is bonded and wherein the adapter ring is a molded piece and the projections are integrally formed thereon and wherein a side of the lower ring member opposite said planar side is formed of at least three portions;
 (i) a first portion which extends radially from the inner periphery of the lower ring member;
 (ii) a second portion which extends vertically downward toward the interior of the bowl body; and
 (iii) a third portion which extends radially outwardly from the second portion to the outer periphery of the lower ring member.

8. The disposable of claim 7 wherein the adapter ring member has at least three radially extending steps formed in the surface bonded to the lower ring member; and two such steps mate with respective first and third portions of the lower ring member.

9. The disposable set of claim 8 wherein the projections are formed on one of the steps of the adapter ring member which mates with one of the portions of the lower ring member.

10. The disposable set of claim 8 further including a circular projecting portion extending about the inner periphery of the adapter ring member and projecting above said lower ring member to form a particle barrier to entry of particulates from said seal.

11. The disposable set of claim 7 further including a static seal formed of an elastomeric diaphragm with first and second ends, and the first end is joined to said header, and the second end is joined to said upper ring member about the periphery of said upper ring member.

12. The disposable set of claim 11 wherein the upper ring member has a peripheral shoulder and the second end of the diaphragm is affixed to said shoulder and a plastic retaining ring encircles the second end to secure the diaphragm to the upper ring member.

* * * * *

UNITED STATES PATENT AND TRADEMARK OFFICE
CERTIFICATE OF CORRECTION

PATENT NO. : 5,045,048

DATED : September 3, 1991

INVENTOR(S) : Edward W. Kaleskas, Thaddeus G. Minior, Jr. and Sepideh H. Nott It is certified that error appears in the above-identified patent and that said Letters Patent is hereby corrected as shown below:

Col. 4, line 14, delete "38" and insert ---36---.

Col. 6, line 50, after "surface" insert ---which is---.

Col. 6, line 51, after "with" insert ---the---.

Col. 7, line 27, delete "upper" and insert ---lower---.

Col. 8, line 11, after "surface" insert ---which is---.

Col. 8, line 12, after "with" insert ---the---.

Col. 8, line 9, after "disposable" insert --set--.

Signed and Sealed this

Twenty-ninth Day of December, 1992

Attest:

DOUGLAS B. COMER

Attesting Officer     Acting Commissioner of Patents and Trademarks